(12) United States Patent
Lübbers (10) Patent No.: US 8,881,772 B2
(45) Date of Patent: Nov. 11, 2014

(54) WELLBORE PIPE PROTECTION DEVICE

(75) Inventor: Gerardus Bernardus Lübbers, Weiteveen (NL)

(73) Assignee: Pipe-Proteq B.V., Emmen (NL)

( * ) Notice: Subject to any disclaimer, the term of this patent is extended or adjusted under 35 U.S.C. 154(b) by 366 days.

(21) Appl. No.: 13/518,048

(22) PCT Filed: Oct. 25, 2010

(86) PCT No.: PCT/NL2010/050709
§ 371 (c)(1), (2), (4) Date: Aug. 9, 2012

(87) PCT Pub. No.: WO2011/078658
PCT Pub. Date: Jun. 30, 2011

(65) Prior Publication Data
US 2012/0312411 A1   Dec. 13, 2012

(30) Foreign Application Priority Data

Dec. 21, 2009   (NL) .................................... 2003992

(51) Int. Cl.
*B65D 59/06* (2006.01)
*F16L 55/115* (2006.01)
*E21B 17/00* (2006.01)
*B65D 59/02* (2006.01)

(52) U.S. Cl.
CPC ............. *B65D 59/02* (2013.01); *F16L 55/1157* (2013.01); *E21B 17/006* (2013.01); *B65D 59/06* (2013.01)
USPC .......................................... 138/96 T; 81/442

(58) Field of Classification Search
CPC ...... E21B 17/006; B56D 59/00; B56D 59/02; B56D 59/04; B56D 59/06; F16L 57/00; F16L 57/005
USPC ......... 138/96 T, 96 R; 81/442–448, 120, 53.2
See application file for complete search history.

(56) References Cited

U.S. PATENT DOCUMENTS 2,238,643 A * 4/1941 Hicks ........................... 138/96 R
2,316,013 A    4/1943 Thomas
(Continued)

FOREIGN PATENT DOCUMENTS

| JP | 11201371 A | 7/1999 |
|----|-----------|--------|
| NL | 2001969 C | 3/2010 |
| WO | WO9907978 A1 | 2/1999 |

OTHER PUBLICATIONS

PCT/NL2010/050709 International Search Report and Written Opinion, 10 pages, Jan. 25, 2011.

(Continued)

*Primary Examiner* — Lien Ngo
(74) *Attorney, Agent, or Firm* — Fish & Richardson P.C.

(57) ABSTRACT

A wellbore pipe protection device (1) comprises a covering sleeve (2) and an actuating element (3). The actuating element is arranged to change the deformation state of a sleeve wall (21) of the covering sleeve in order to realize interchangeability between a locked condition and an unlocked condition of the protection device. In the locked condition, elastic material (4) is being pressed by the sleeve wall into screw thread (8) of a wellbore pipe end (7). The actuating element comprises a handgrip (9) which, relative to the covering sleeve, is manually slidable in axial direction (5) and, in the locked condition, manually rotatable about the axial direction into a rotation position in which axial slidability of the actuating element is blocked in a direction towards the unlocked condition.

8 Claims, 7 Drawing Sheets

(56) References Cited

U.S. PATENT DOCUMENTS

| | | | |
|---|---|---|---|
| 3,494,504 A * | 2/1970 | Jackson | 220/237 |
| 3,586,056 A * | 6/1971 | Kipp et al. | 138/89 |
| 3,613,936 A * | 10/1971 | Kaiser et al. | 220/237 |
| 3,618,811 A * | 11/1971 | Martino | 220/235 |
| 4,415,005 A | 11/1983 | Janzen | |
| 4,429,719 A | 2/1984 | Mosing | |
| 4,487,228 A * | 12/1984 | Waldo et al. | 138/96 T |
| 4,616,679 A | 10/1986 | Benton | |
| 4,768,560 A * | 9/1988 | Logsdon | 138/90 |
| 4,796,668 A * | 1/1989 | Depret | 138/96 T |
| 5,044,403 A * | 9/1991 | Chen | 138/89 |
| 5,469,679 A * | 11/1995 | Burkard et al. | 52/301 |
| 6,360,636 B1 * | 3/2002 | Elftmann | 81/445 |
| 7,396,060 B2 * | 7/2008 | Huncovsky | 294/96 |
| 8,312,898 B2 * | 11/2012 | Coscarella | 138/89 |

OTHER PUBLICATIONS

PCT/NL2010/050709 International Preliminary Report on Patentability, 7 pages, Jun. 26, 2012.

* cited by examiner

WELLBORE PIPE PROTECTION DEVICE

CROSS-REFERENCE TO RELATED APPLICATIONS

This application is a U.S. National Phase Application of International Patent Application No. PCT/NL2010/050709, filed Oct. 25, 2010, and entitled "WELLBORE PIPE PROTECTION DEVICE," which claims priority to Netherlands Patent Application No. 2003992, filed on Dec. 21, 2009, both of which are incorporated herein by reference.

FIELD AND BACKGROUND OF THE INVENTION

The invention relates to a wellbore pipe protection device for protecting, in a condition mounted to a wellbore pipe end, the screw thread of the pipe end.

It is remarked that the term "wellbore pipe" as referred to in the present text is meant to comprise various types of pipes used in wellbore operations, both during drilling phases and during production phases. Hence, the term "wellbore pipe" comprises various types of drill, casing and tubing pipes used in wellbores.

Such protection devices serve to protect internal or outside screw threads of wellbore pipe ends against potential damage during transportation and storage of wellbore pipes. When wellbore pipes are in operation, i.e. when they are interconnected to form a pipe string, the protection devices have been removed from the pipe ends.

In practice, types of wellbore pipe protection devices are known, wherein the protection device has a substantially cylindrical body provided with screw thread for co-operation with the screw thread of a wellbore pipe. For a first class of these known devices, its cylindrical body has internal screw thread that matches the outside screw thread of the corresponding wellbore pipe end. For a second class of these known devices, its cylindrical body has outside screw thread that matches the internal screw thread of the corresponding wellbore pipe end. When installing known devices of the said type, an operator screws the devices onto/into the wellbore pipe ends. When de-installing these known devices, an operator manually unscrews the devices from the pipe ends.

A drawback of these known devices is, that the screwing and unscrewing of the protection devices relative to the wellbore pipes is a time consuming task. The reason is that the screwing and unscrewing involves relative movements over relatively long helical paths and with relatively high friction. Since wellbore operations typically require the handling of large numbers of wellbore pipes, the time consuming task of installing and de-installing the large numbers of protection devices has a negative influence on the speed of the operations and/or the related labour costs involved in the operations. Note, that wellbore operations normally take place in relatively unclean environments, which often leads to dirty screw threads of protection devices and of wellbore pipes. This further hampers the task of screwing and unscrewing of the protection devices.

In view of the abovementioned drawbacks, some other protection devices are known which other devices are not based upon screwing and unscrewing of such device relative to the pipe's screw thread to be protected.

U.S. Pat. No. 4,429,719A discloses a pipe thread protector according to the preamble of independent claim 1 appended to the present specification. This protector known from U.S. Pat. No. 4,429,719A has an inner member 12 and an outer member 11. In mounted condition of the protector, these inner and outer members may be interlocked relative to one another by means of a vacuum system. The vacuum system is manually controlled by means of a valve 21 which is manually retractable by means of a handle 34. Removing the protector from the pipe requires the successive steps of: manually retracting the handle for allowing the vacuum to be cancelled, manually pulling away the outer member from the pipe and manually pulling away the inner member from the pipe. Conversely, mounting the protector onto the pipe requires, firstly, the manual placement of the inner member and, secondly, the manual placement of the outer member. Each of such steps of pulling away and of placing of the inner member and of the outer member generally needs to be performed by two hands of an operator. All in all, removing and mounting this known pipe thread protector are still relatively time consuming. Since wellbore operations typically require the handling of large numbers of wellbore pipes, the time consuming task of installing and de-installing the large numbers of this known pipe thread protector has a negative influence on the speed of the operations and/or the related labour costs involved in the operations.

Another device for protecting threaded ends of pipes is known from U.S. Pat. No. 2,238,643A. This document discloses a protector for interior threads of pipe ends. This known protector comprises a frusto-conical cup 3 arranged in segments, a paper cup 12, as well as a coniform screw-threaded plug 16 extending through the bottom wall 5 of the cup 3 in screw-threaded engagement therewith. Installing and de-installing of this known protector require, amongst others, the continued screwing of the tapered screw-threaded plug 16, evidently by using a special tool.

Yet another device for protecting threaded ends of pipes is known from WO99/07978A1 (hereinafter "WO'978"). This known device has a cap member 15a having a covering sleeve 21 (see FIGS. 2A and 3A of WO'978). The cap member 15a may be fitted to the socketed end 12c of a pipe section 12 (see FIG. 1 of WO'978) by means of a tension means 16 (separately shown in FIG. 6 of WO'978). The tension means 16 comprises a stem 40 (see FIG. 2A of WO'978) with outwards facing threading cooperating with a corresponding inwards facing threading of a holder 17, which holder 17 is fixedly attached to the cap member 15a. The stem 40 is manually pivotable by means of a loose handgrip tool 45 (see FIGS. 10 and 11 of WO'978). Manual pivotation of the handgrip tool 45 results in movement of a wedge member 18, which results in deformation of a clamping member 39, as well as radial movements of web portions 38 and mutual movements of clamping means 20a-20c (see FIG. 8 of WO'978). Eventually, all these movements result in clamping or unclamping of the covering sleeve 21 relative to the inwards facing threading 12d of the socketed pipe end 12c. In other words, a pivotation of the handgrip tool 45 in one direction brings the protector device in its locked condition, while a pivotation of the handgrip tool 45 in the opposite direction brings the protector device in its unlocked condition. Hence the protector device known from WO'978 has similarity with the protector known from the abovementioned document U.S. Pat. No. 2,238,643A in the sense that screw-threaded engagement of parts of the device has to be manually adjusted in order to realise the interchangeability between the locked condition and the unlocked condition. The locking structure of the device known from WO'978, however, is evidently much more complicated than that of U.S. Pat. No. 2,238,643A. Furthermore it is disadvantageous, both for the device known from WO'978 and for the device known from U.S. Pat. No. 2,238,643A, that, once these devices are in their locked condition, the tightened screw-threaded engagements may loosen, which results in the undesired circumstance that these known devices come loose from the pipe that is to be protected by them. Hence, in their locked conditions, these devices are not reliably fixed to the pipes. As will soon be apparent from the "SUMMARY OF THE INVENTION" and the "DETAILED DESCRIPTION" hereinafter, the protection device according to the invention solves these disadvantages. I.e., the protection device according to the invention has a simple locking structure providing ease and speed of manually installing and de-installing the device, while in its locked condition the device is reliably fixed to the wellbore pipe.

Another thread protector is disclosed in U.S. Pat. No. 4,379,471A. FIGS. 1-3 of U.S. Pat. No. 4,379,471A show that this known thread protector has a quite complicated locking structure. This locking structure comprises a wedge shaped locking member 30, up-bent tabs 18 and 20, and a tee tab lock member 36. A sharp object, such as the tip of a screw driver, must be employed to disengage the lock member 30 as shown in FIG. 2 of U.S. Pat. No. 4,379,471A.

Yet another thread protector is disclosed in U.S. Pat. No. 2,098,087A. Also this known thread protector has a quite complicated locking structure that requires the use of suitable tools for its operation.

SUMMARY OF THE INVENTION

It is an object of the invention to provide at least an alternative solution according to which the ease and speed of manually installing and de-installing wellbore pipe protection devices is improved, while such protection device in its mounted condition is reliably fixed to a wellbore pipe.

For that purpose, the invention provides a wellbore pipe protection device according to claim 1.

In the unlocked condition of the protection device, an operator is able to quickly and easily put the protection device on the wellbore pipe end as well as take off the protection device from the wellbore pipe end. This is in contrast with the abovementioned known protection device of the screwing/unscrewing type, which requires laborious screwing or unscrewing of the protection device. Protection devices according to the invention can easily and with only little friction be put on the wellbore pipe end by inserting the sleeve wall coaxially into the pipe end or, as the case may be, by sliding the sleeve wall coaxially over the pipe end. Also the removal of the protection device from a wellbore pipe is easy for a protection device according to the invention. The reason is that in the unlocked condition the sleeve wall can simply be slided out or off the pipe end coaxially. The presence of some dirt in the screw thread of the pipe end does not hamper the installing or de-installing of the protection devices, since there is no screwing or unscrewing involved.

Also the manual operation of the actuating element to change the condition of the protection device between its locked condition and its unlocked condition, and vice versa, is an easy task for an operator which can be performed rapidly. It merely requires the actuating element to change the deformation state of the sleeve wall, which can easily be accomplished by a simple, short manual movement of the operator.

In the locked condition the elastic material is firmly being pressed by the sleeve wall into the screw thread, which prevents the protection device from becoming detached from the pipe due to accidental external impacts that may occur during transportation and storage of wellbore pipes. It is remarked that various kinds of elastic materials, provided on the covering side of the sleeve wall, may be used, both natural and synthetic materials, such as natural or synthetic rubber. Also, the elastic material may be provided on the covering side in various shapes and distribution patterns.

As compared with the abovementioned known protection devices of the screwing/unscrewing type, it is a further advantage of a protection device according to the invention that, when it is arranged for a specific diameter of a wellbore pipe end, it fits for various types and shapes of screw threads of the pipe ends. Also, for a protection device according to the invention being arranged for such a specific diameter, it is possible to modify shapes and distribution patterns of the elastic material provided on its covering side. Thus, the shapes and distribution patterns of the elastic material can each time be chosen to be optimally tailored for specific ones of the various types and shapes of screw threads of the pipe ends.

Another drawback of the abovementioned known protection devices of the screwing/unscrewing type is that screwing and unscrewing of these known devices relative to the pipe ends adversely effects the lubrication present in the screw threads of the pipe ends. That is: by such screwing and unscrewing, lubrication substances are more or less removed from the said screw threads. It is a further advantage of a protection device according to the invention that such adverse effect is avoided since for a protection device according to the invention there is no screwing or unscrewing involved.

As compared with the abovementioned pipe thread protector known from U.S. Pat. No. 4,429,719A, the protection device according to the invention at least distinguishes therefrom in that the actuating element comprises a handgrip which, relative to the covering sleeve, is manually slidable at least with a component in the axial direction of the covering sleeve for realizing the slidability of the actuating element, and which, in the locked condition, relative to the covering sleeve, is manually rotatable about said axial direction into a rotation position in which said slidability of the actuating element is blocked at least in a direction towards the unlocked condition.

Such a handgrip is very easy to operate, it does not require complex or precise operation. Such ease of operation is highly desirable in the typically rough working environment in which operators have to install or de-install large numbers of protection devices.

For installing a protection device according to the invention, an operator may simply pick-up the device (e.g. from a stock, from the floor, etc.) by grasping the handgrip with only a single hand. Still holding the device in that single hand, the operator may simply place the device into/over the pipe end, then push onto the handgrip and subsequently rotate the handgrip into said rotation position in which said slidability of the actuating element is blocked. Because of this blocking, the device is reliably fixed to the pipe. In fact, the combined manoevers comprising said picking-up, said placing, said pushing and said rotating may be performed in a single, smooth, continuous, on-going movement of only a single hand of the operator, which is very fast and does not require any specific tool or equipment. By using both hands, an operator is even able to quickly install two different devices simultaneously onto ends of two different pipes.

Conversely, it will be clear that also the removal of the protection device from a wellbore pipe is correspondingly easy and fast. All that is needed is: grasp the handgrip with one hand, rotate it, withdraw it to bring the device in its unlocked condition, withdraw it a little further to take the device off from the pipe end, and put the device away. Again, the combined manoevers comprising said grasping, said rotating, said withdrawings and said putting away may be performed in a single, smooth, continuous, on-going movement of only a single hand of the operator, which is very fast and does not require any specific tool or equipment. By using both hands, an operator is even able to de-install two different devices simultaneously from ends of two different pipes.

Therefore, as compared to existing thread protection devices, the improvements in ease and speed of installing and de-installing a device according to the invention are astonishing, while there is no sacrifice as to the reliability of the device.

Specific embodiments of the invention are set forth in the dependent claims.

In a preferable embodiment, the covering sleeve and the actuating element are manually undetachable relative to one another. Thus, the covering sleeve and the actuating element of each protection device remain inseparable for users such as wellbore pipe operators and other persons handling the protection devices during their transportation and storage. As a result, extra work for reconnecting these parts is prevented.

In another preferable embodiment, elastic sealing material is filling up the slits in the sleeve wall. Such elastic material prevents undesired substances to penetrate, via the slits in the sleeve wall, into the the screw thread of the pipe end.

In yet another preferable embodiment, at least part of the elastic material is elastic material of at least one O-ring extending coaxially relative to the sleeve wall. Applying one or more of such O-rings is effective, simple and cheap.

Preferably, the sleeve wall comprises at least one annular groove in which the at least one O-ring is received. Thus, an effective and simple solution is provided that prevents such an O-ring from moving in axial direction relative to the sleeve wall.

In one class of embodiments of a protection device according to the invention, the protection device is arranged for protecting outside screw thread of a wellbore pipe end. For this other class the covering side of the sleeve wall is the side of the sleeve wall facing towards the central axis of the sleeve wall for covering, in the mounted condition, the outside screw thread when the sleeve wall is coaxially slid over the pipe end.

In another class of embodiments of a protection device according to the invention, the protection device is arranged for protecting internal screw thread of a wellbore pipe end. For this class the covering side of the sleeve wall is the side of the sleeve wall facing away from the central axis of the sleeve wall for covering, in the mounted condition, the internal screw thread when the sleeve wall is coaxially inserted into the pipe end.

In a preferable embodiment of the last mentioned class of embodiments of a protection device according to the invention, an elastic sealing disc is retained by the actuating element at a side of the covering sleeve facing away from the handgrip, which sealing disc extends substantially coaxially with the covering sleeve and substantially transverse to said axial direction. Such a sealing disc prevents undesired substances present in the interior of the wellbore pipe to penetrate into the internal screw thread of the pipe end.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the schematic figures in the enclosed drawing.

DETAILED DESCRIPTION

Figure 1:
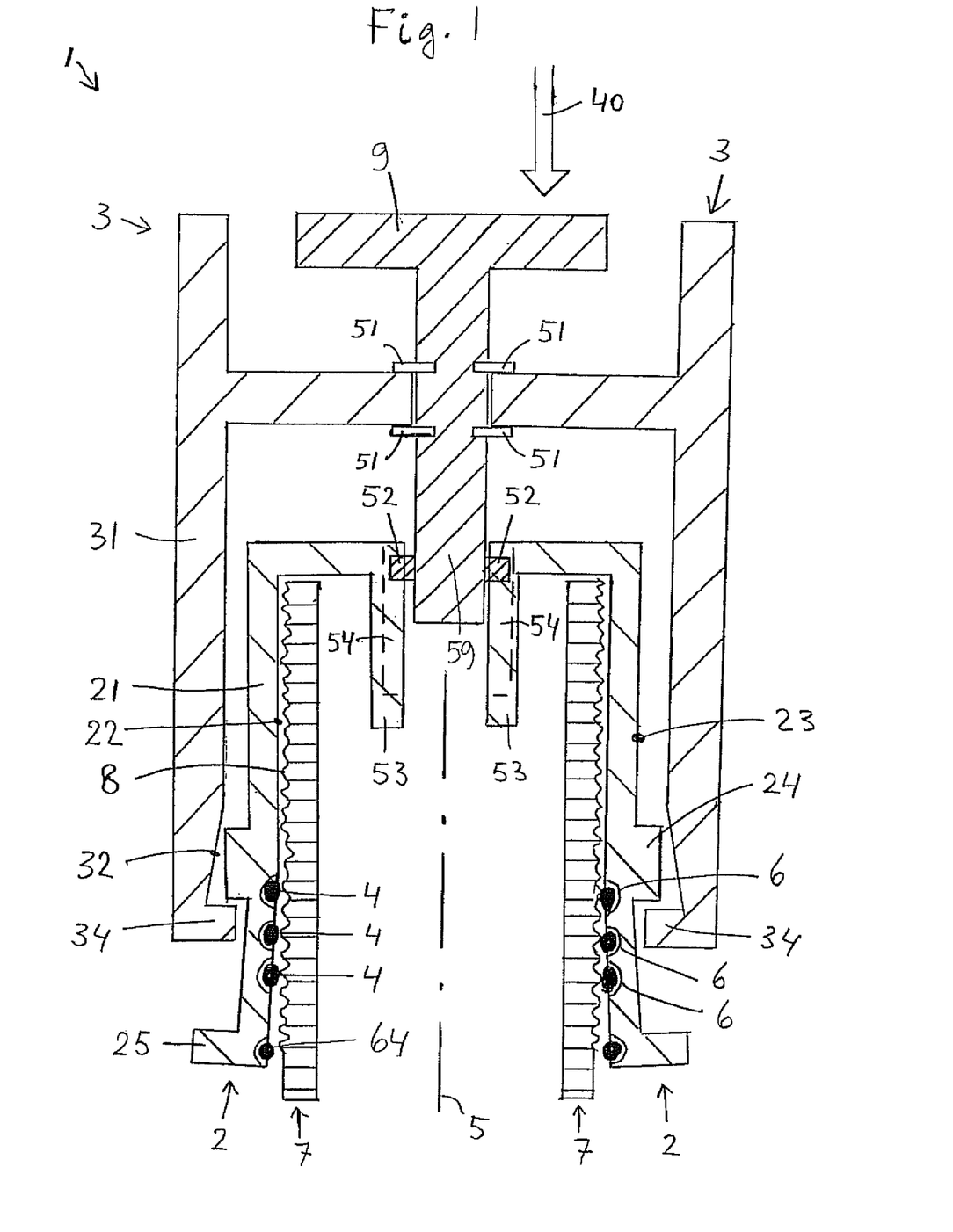
FIG. 1 shows, in longitudinal section, an example of an embodiment of a protection device according to the invention when the protection device is mounted, in unlocked condition, to a wellbore pipe end having outside screw thread.
Figure 2:
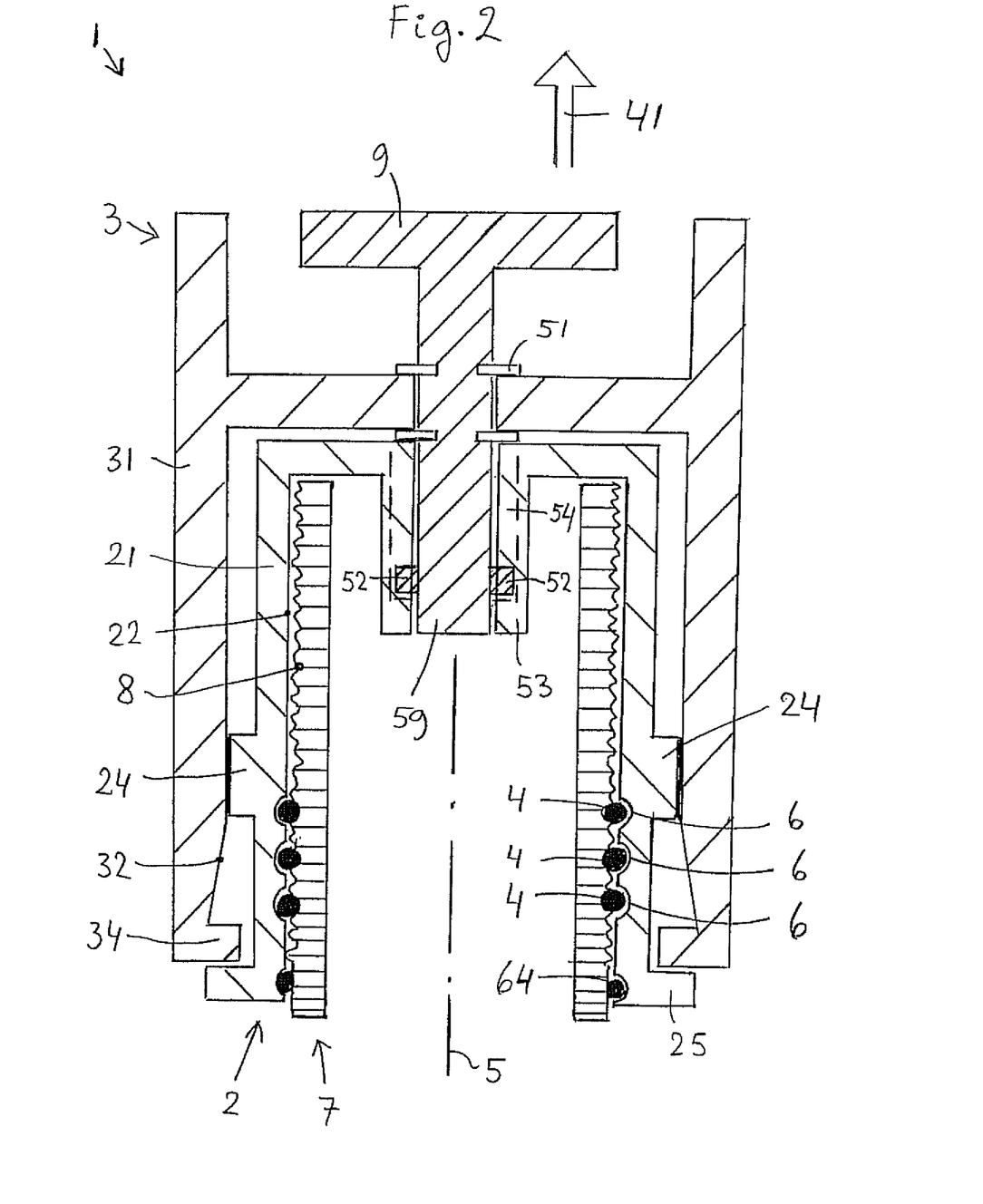
FIG. 2 shows the example of FIG. 1 once again, however in the locked condition of the protection device.
Figure 3:
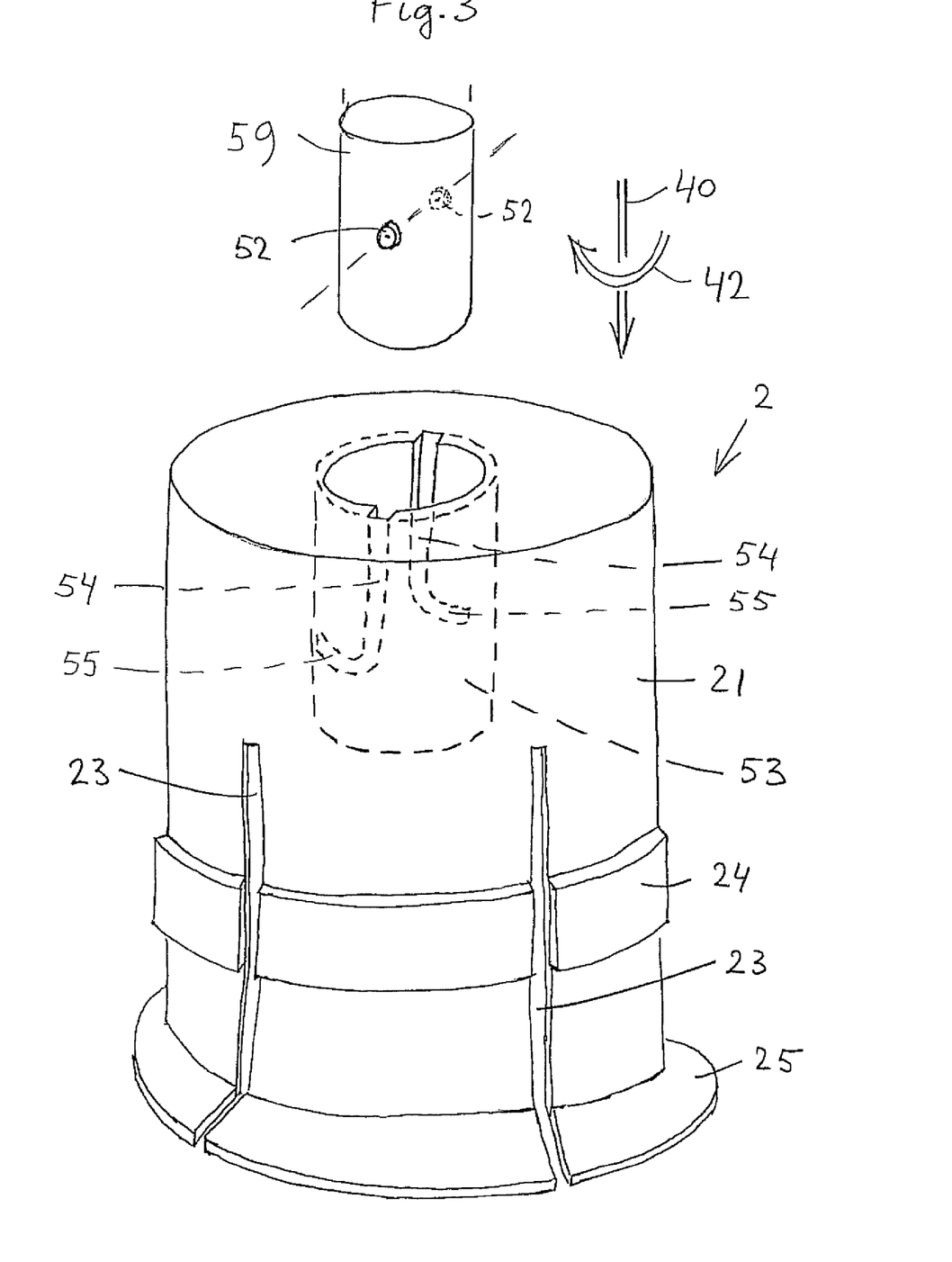
FIG. 3 shows, in a perspective view, the covering sleeve together with part of the actuating element of the protection device of FIGS. 1 and 2.

Reference is first made to the embodiment shown in FIGS. 1-3.

FIGS. 1 and 2 show a wellbore pipe protection device 1 according to the invention in a condition mounted to a wellbore pipe end 7. The device 1 is arranged for protecting outside screw thread 8 of the pipe end 7. In the shown mounted condition, the device 1 is manually operable to interchange its condition between a locked condition (shown in FIG. 2) and an unlocked condition (shown in FIG. 1). In the locked condition, the device 1 is fixed to the pipe in a manner so as to prevent the device from becoming detached from the pipe due to certain accidental external impacts. In the unlocked condition, the device 1 is fixed to the pipe less firmly than in the locked condition and the device is manually removable from the pipe then.

The device 1 comprises a covering sleeve 2 and an actuating element 3.

The covering sleeve 2 comprises a peripheral sleeve wall 21 having a central axis 5. The side of the sleeve wall 21 facing towards the central axis 5 is a covering side 22 for covering the screw thread 8 of the pipe end 7. This covering of the screw thread takes place in the shown mounted condition, i.e. when the sleeve wall 21 is coaxially slid over the pipe end 7.

The covering sleeve 2 is provided on the covering side 22 of the sleeve wall with elastic material 4. At least part of the sleeve wall 21 is flexible while the sleeve wall 21 is interrupted by slits 23 (see FIG. 3). The length directions of the slits 23 extend at least in the axial direction 5, such that the sleeve wall 21 is deformable in such way that at least the diameter of the sleeve wall 21 is, in at least a subrange in the axial direction 5, adjustable.

The said adjustability of the diameter of the sleeve wall 21 enables the said interchangeability between the locked condition and the unlocked condition in that the elastic material 4 in the locked condition is being pressed by the sleeve wall 21 into the screw thread 8 (see FIG. 2), while in the unlocked condition it is not, or less firmly than in the locked condition, being pressed into the screw thread 8 (see FIG. 1). Note that one or more additional sealing rings, such as the sealing ring 64 shown in FIGS. 1 and 2, can be applied for pressing contact in the locked condition (see FIG. 2) between the sleeve wall 21 and the pipe end 7 at locations where there is no screw thread 8. This prevents undesired substances to penetrate into the screw thread 8.

The actuating element 3 is slidable, relative to the covering sleeve 2, in the axial direction 5 of the covering sleeve for realizing changes in the deformation state of the sleeve wall 21 in order to realise the said interchangeability between the locked condition and the unlocked condition. In the shown example, the actuating element 3 comprises a peripheral sleeve wall 31 which is coaxially surrounding the sleeve wall 21 of the covering sleeve 2. The sleeve wall 21 of the covering sleeve 2 has an annular shaped protrusion 24 on its side 23 opposite its covering side 22. The side 32 of the sleeve wall 31 of the actuating element 3 facing towards the central axis 5 has an inclined shape relative to the central axis 5. The manual operation of the actuating element 3 can be performed by means of a handgrip 9 of the actuating element 3. When a user moves, starting off from the unlocked condition shown in FIG. 1, the handgrip 9 in the direction 40 (see FIG. 1) parallel to the central axis 5, the sleeve wall 31 of the actuating element 3 will gradually push the sleeve wall 21 of the covering sleeve 2 further towards the screw thread 8 of the pipe end 7 until the locked condition shown in FIG. 2 is attained. This is enabled by sliding abutting contact between the inclined parts of the side 32 of the sleeve wall 31 of the actuating element 3 on the one hand, and the annular protrusion 24 of the side 23 of the sleeve wall 21 of the covering sleeve 2 on the other hand, as well as by the said deformability of the sleeve wall 21. When a user moves, starting off from the locked condition shown in FIG. 2, the handgrip 9 in the direction 41 (see FIG. 2), i.e. opposite to the direction 40 of FIG. 1, the sleeve wall 21 of the covering sleeve 2 will gradually relax until the unlocked condition shown in FIG. 1 is attained.

For realizing the manual moveability of handgrip 9 relative to the covering sleeve 2, the handgrip 9 is fixedly connected to a cylindrical rod 59. The rod 59 is situated coaxially with the covering sleeve 2 and the actuating element 3. Axial movements of the rod 59 relative to other parts of the actuating element 3 are prevented by means of retaining rings 51. However, the rod 59 is free to rotate relative to other parts of the actuating element 3 around the axial direction. The rod 59 is received in a bush 53 of the covering sleeve 2, which bush 53 is coaxial with and fixedly connected relative to the sleeve wall 21 of the covering sleeve 2. The rod 59 has a number of pins 52 transversely protruding therefrom. These pins 52 are guidingly received in guiding slits present in the bush 53. As best seen in FIG. 3, these guiding slits have axially directed portions 54, as well as tangentially directed portions 55 connected to the axially directed portions 54. Thus, the handgrip 9 is manually slidable, relative to the covering sleeve 2, in the direction 40 (see FIG. 3). During this sliding, the pins 52 are guided in the axially directed portions 54. After this sliding, the locked condition of the device 1 can be obtained. In this locked condition, the handgrip 9 is manually rotatable, relative to the covering sleeve, in the direction 42 (see FIG. 3). During this rotation, the pins 52 are guided in the tangentially directed portions 55. After this rotation, a rotation position can be obtained in which axial movement of the handgrip relative to the bush 53 is blocked in a direction towards the unlocked condition.

It is remarked that it is possible to apply additional sealing material, for example at or near the retaining rings 51 (see FIG. 1), for preventing that undesired substances penetrate through the actuating element 3.

Reference is now made to the other embodiment shown in FIGS. 4-7.

Figure 4:
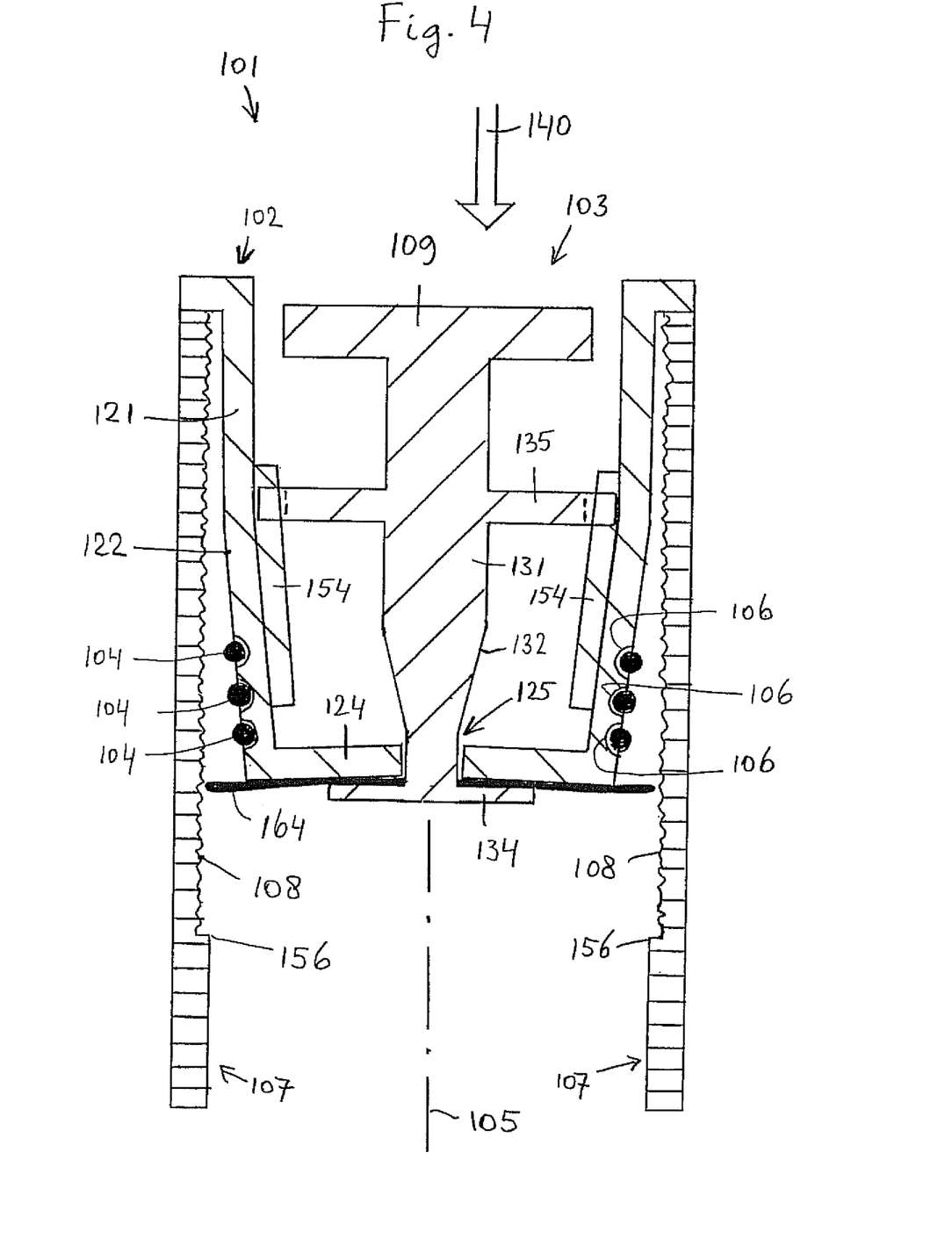
FIG. 4 shows, in longitudinal section, an example of another embodiment of a protection device according to the invention when the protection device is mounted, in unlocked condition, to a wellbore pipe end having inside screw thread.
Figure 5:
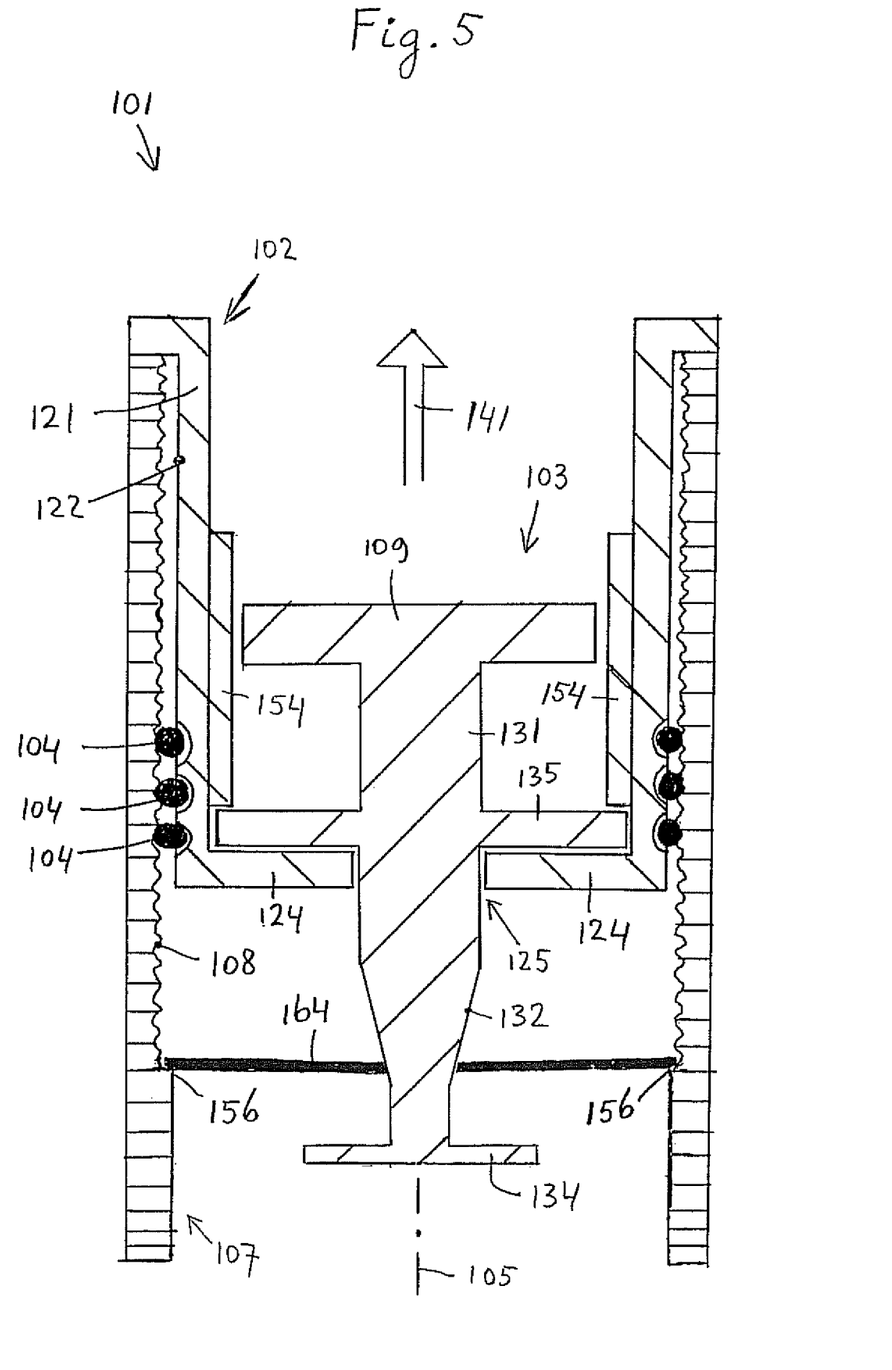
FIG. 5 shows the example of FIG. 4 once again, however in the locked condition of the protection device.
Figure 6:
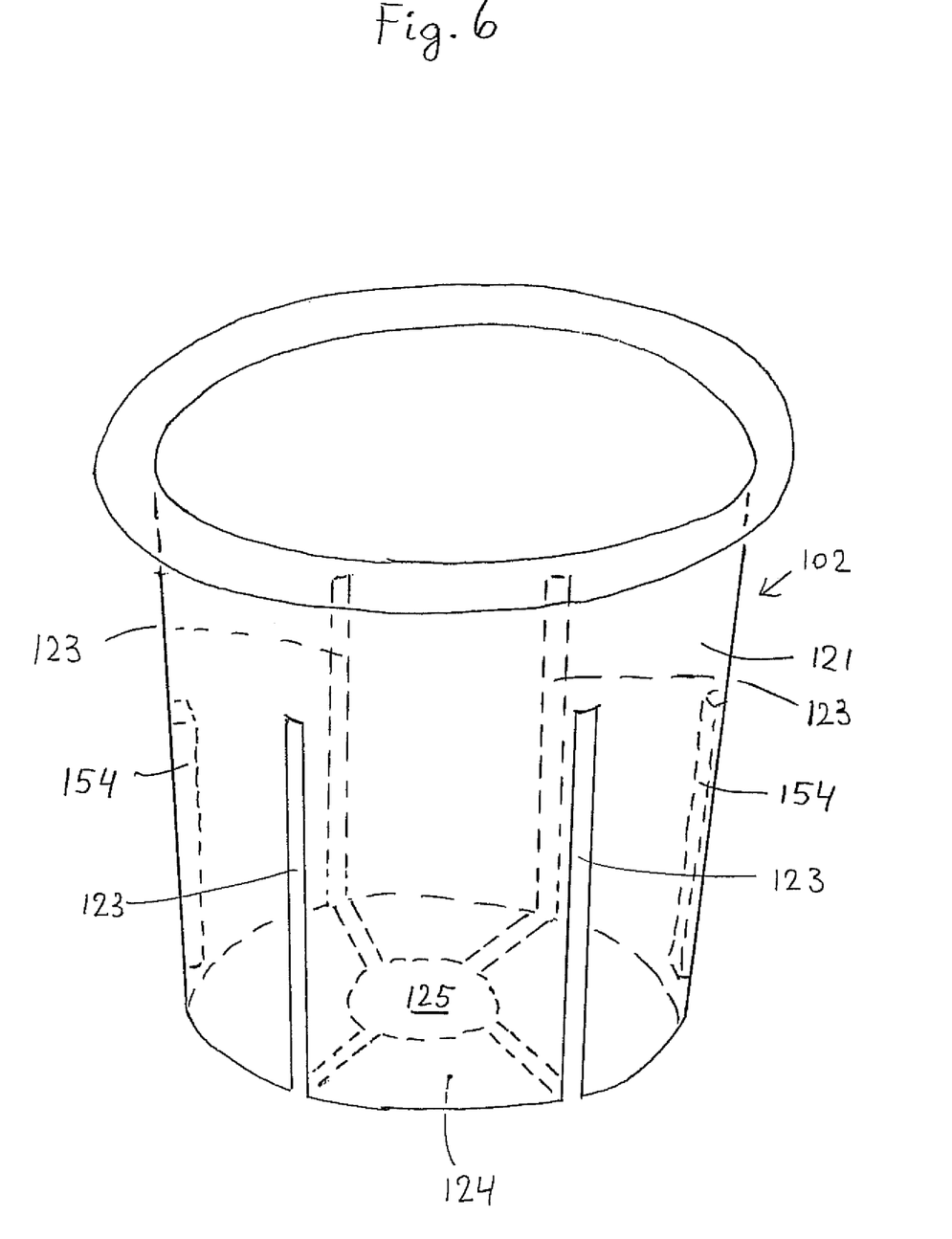
FIG. 6 shows, in a perspective view, the covering sleeve of the protection device of FIGS. 4 and 5.
Figure 7:
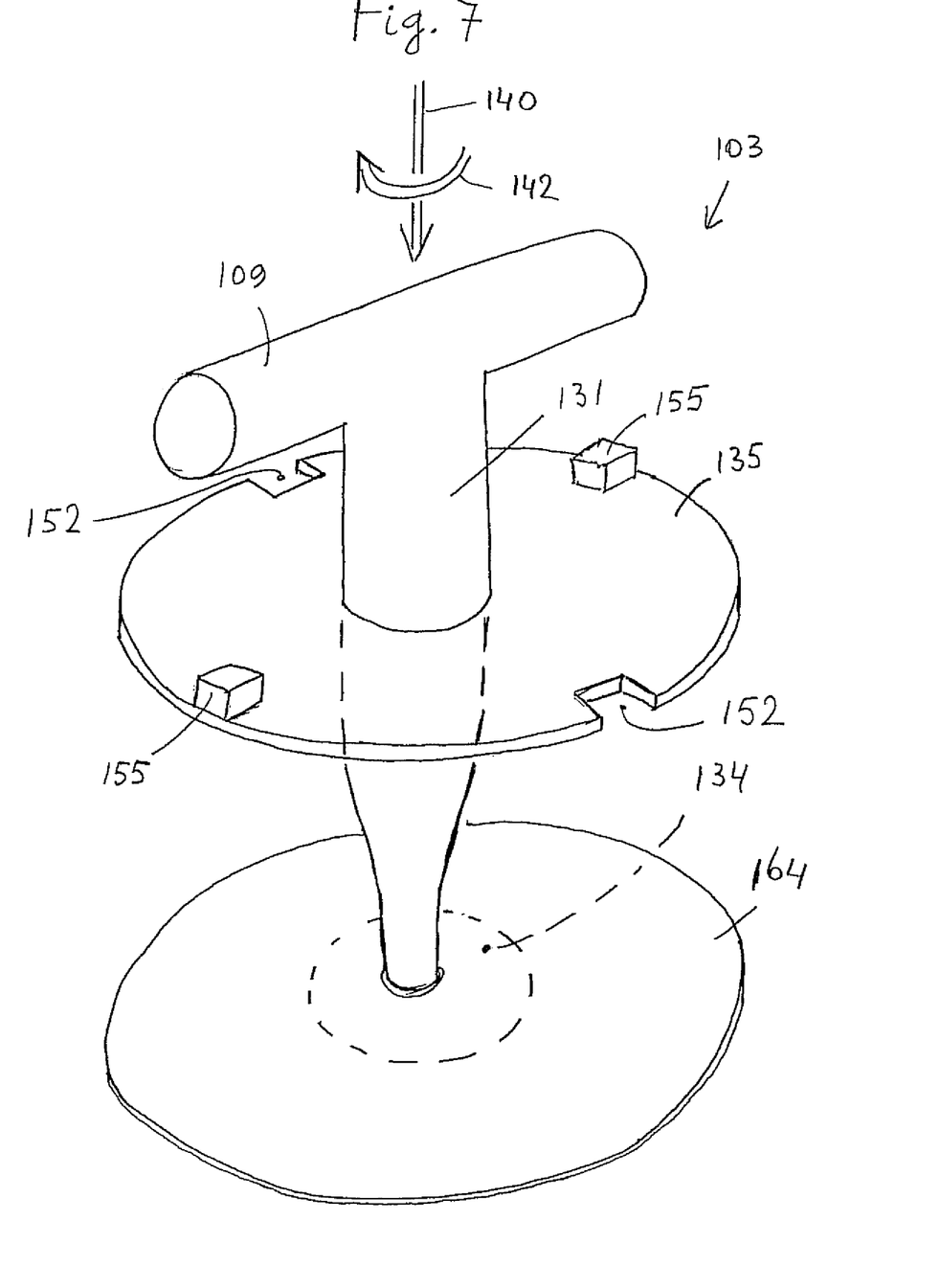
FIG. 7 shows, in a perspective view, the actuating element of the protection device of FIGS. 4 and 5.

FIGS. 4 and 5 show a wellbore pipe protection device 101 according to the invention in a condition mounted to a wellbore pipe end 107. The device 101 is arranged for protecting inside screw thread 108 of the pipe end 107. In the shown mounted condition, the device 101 is manually operable to interchange its condition between a locked condition (shown in FIG. 5) and an unlocked condition (shown in FIG. 4). In the locked condition, the device 101 is fixed to the pipe in a manner so as to prevent the device from becoming detached from the pipe due to certain accidental external impacts. In the unlocked condition, the device 101 is fixed to the pipe less firmly than in the locked condition and the device is manually removable from the pipe then.

The device 101 comprises a covering sleeve 102 and an actuating element 103.

The covering sleeve 102 comprises a peripheral sleeve wall 121 having a central axis 105. The side of the sleeve wall 121 facing away from the central axis 105 is a covering side 122 for covering the inside screw thread 108 of the pipe end 107. This covering of the screw thread takes place in the shown mounted condition, i.e. when the sleeve wall 121 is coaxially inserted into the pipe end 107.

The covering sleeve 102 is provided on the covering side 122 of the sleeve wall 122 with elastic material 104. At least part of the sleeve wall 121 is flexible while the sleeve wall 121 is interrupted by slits 123 (see FIG. 6). The length directions of the slits 123 extend at least in the axial direction 105, such that the sleeve wall 121 is deformable in such way that at least the diameter of the sleeve wall 121 is, in at least a subrange in the axial direction 105, adjustable.

The said adjustability of the diameter of the sleeve wall 121 enables the said interchangeability between the locked condition and the unlocked condition in that the elastic material 104 in the locked condition is being pressed by the sleeve wall 121 into the screw thread 108 (see FIG. 5), while in the unlocked condition it is not, or less firmly than in the locked condition, being pressed into the screw thread 108 (see FIG. 4).

The actuating element 103 is slidable, relative to the covering sleeve 102, in the axial direction 105 of the covering sleeve for realizing changes in the deformation state of the sleeve wall 121 in order to realise the said interchangeability between the locked condition and the unlocked condition. In the shown example, the actuating element 103 comprises an actuating body 131 which is rotationally symmetrically situated relative to the central axis 105 and which is coaxially surrounded by the sleeve wall 121 of the covering sleeve 102. The covering sleeve 102 has, at an edge of its sleeve wall 121 being inserted furthest into the pipe end 107, an annular shaped flange 124 which is extending from that edge in a direction towards the central axis 105. This annular flange 124 surrounds a passage 125 through the covering sleeve 102, through which passage 125 the actuating body 131 of the actuating element 103 is extending. The outer peripheral side 132 of the actuating body 131 of the actuating element 103 has an inclined shape relative to the central axis 105.

The manual operation of the actuating element 103 can be performed by means of a handgrip 109 of the actuating element 103. When a user moves, starting off from the unlocked condition shown in FIG. 4, the handgrip 109 in the direction 140 (see FIG. 4) parallel to the central axis 105, the actuating body 131 of the actuating element 103 will gradually push the sleeve wall 121 of the covering sleeve 102 further towards the screw thread 108 of the pipe end 107 until the locked condition shown in FIG. 5 is attained. This is enabled by sliding abutting contact between the inclined parts of the side 132 of the actuating body 131 of the actuating element 103 on the one hand, and the annular flange 124 of the covering sleeve 102 on the other hand, as well as by the said deformability of the sleeve wall 121. When a user moves, starting off from the locked condition shown in FIG. 5, the handgrip 109 in the direction 141 (see FIG. 5), i.e. opposite to the direction 140 of FIG. 4, the sleeve wall 121 of the covering sleeve 102 will gradually relax until the unlocked condition shown in FIG. 4 is attained.

For realizing the manual moveability of handgrip 109 relative to the covering sleeve 102, an annularly shaped flange 135 of the actuating body 131 has a number of recesses 152 at its outer periphery (see FIG. 7), while the sleeve wall 121 of the covering sleeve 102 has a number of guiding ribs 154 interior of the covering sleeve 102. The flange 135 can guidingly slide, with these recesses 152, along the guiding ribs 154. The guiding ribs 154 are extending in the axial direction 105. Thus, the handgrip 109 is manually slidable, relative to the covering sleeve 102, in the direction 140 (see FIG. 7). After this sliding, the locked condition of the device 101 can be obtained. In this locked condition, the handgrip 109 is manually rotatable, relative to the covering sleeve 102, in the direction 142 (see FIG. 7). This rotation is made possible in that the guiding ribs 154 do not fully extend upto the annular flange 124 of the covering sleeve 102, leaving interspaces inbetween each of the guiding ribs 154 and the flange 124. Outer parts of the flange 135 may thus be interposed in these interspaces, as shown in FIG. 5. After said rotation, a rotation position can be obtained in which axial movement of the handgrip 109 relative to the covering sleeve 102 is blocked in a direction towards the unlocked condition. Note, that the flange 135 may have one or more protruding elements, such as the elements 155 shown in FIG. 7, which limit the rotation range by abutting contact between the elements 155 and the guiding ribs 154.

In the shown example of FIGS. 4-7, an elastic sealing disc 164 is retained by the actuating element 103 at a side of the covering sleeve 102 facing away from the handgrip 109. This sealing disc 164 extends substantially coaxially with the covering sleeve 102 and substantially transverse to the axial direction 105. In the unlocked condition shown in FIG. 4, the sealing disc 164 is located, in close proximity, inbetween an annularly shaped end flange 134 of the actuating element 103 and the flange 124 of the covering sleeve 102. When a user moves, starting off from the unlocked condition shown in FIG. 4, the handgrip 109 in the direction 140, the sealing disc 164 also moves in the direction 140. At some point during its movement, outer parts of the sealing disc 164 will abut a ridge 156, which ridge 156 is normally present in pipes having inside screw thread. Pushing the handgrip further in the direction 140, will cause the sealing disc 164 to slide over the actuating body 131, in particular over the inclined parts of the side 132 of the actuating body 131. Thus, the sealing disc 164 will be held with tension inbetween said inclined parts and the ridge 156 (see FIG. 5), which tension gives favourable sealing properties. When a user moves, starting off from the locked condition shown in FIG. 5, the handgrip 109 in the direction 141, the sealing disc 164 will return to its position shown in FIG. 4.

In each of the embodiments of FIGS. 1-7, the covering sleeve and the actuating element are manually undetachable relative to one another. Thus, the covering sleeve and the actuating element of each protection device remain inseparable for users such as wellbore pipe operators and other persons handling the protection devices during their transportation and storage. As a result, extra work for reconnecting these parts is prevented. In the embodiment of FIGS. 1-3, this undetachability is realized in that the sleeve wall 31 of the actuating element 3 has, at an edge of its sleeve wall 31, an annular shaped flange 34 (see FIGS. 1 and 2) which is extending from that edge in a direction towards the central axis 5. The annular shaped flange 34 will abut the annular protrusion 24 of the side 23 of the sleeve wall 21 of the covering sleeve 2 when, starting off from the shown position in FIG. 1, the actuating element 3 is moved in a direction opposite to the direction 40 indicated in FIG. 1, thus preventing the manual separation of the covering sleeve 2 and the actuating element 3. In the other embodiment of FIGS. 4-7, the undetachability is realized in that the actuating body 131 has, on opposite sides of the passage 125 through which it extends, the annular shaped flanges 134 and 135, respectively, (see FIGS. 4, 5 and 7). These annular shaped flanges 135 and 134, respectively, will abut the annular shaped flange 124 of the covering sleeve 102 when, starting off from the shown positions in FIGS. 4 and 5, respectively, the actuating element 103 is moved in the direction 140 and 141, respectively, thus preventing the manual separation of the covering sleeve 102 and the actuating element 103.

In each of the embodiments of FIGS. 1-7, it is possible to fill up the slits in the sleeve wall with elastic sealing material. That is, the slits 23 shown in FIG. 3, as well as their extensions in the shown flange 25 of the covering sleeve 2, may be filled up with for example some suitable elastic cement. Also the slits 123 shown in FIG. 6, as well as their extensions in the flange 124 of the covering sleeve 102, may be filled up with for example some suitable elastic cement.

In each of the embodiments of FIGS. 1-7, the elastic material 4 and 104, respectively, is provided by means of three O-rings extending coaxially relative to the covering sleeve wall 21 and 121, respectively. For that purpose, each covering sleeve wall 21 and 121, respectively, comprises three annular grooves 6 and 106, respectively, in which the three O-rings are received. However, other numbers of such O-rings may be applied for each protection device, such as one O-ring, two O-rings or more than three O-rings. Also, as already mentioned above, instead of or in addition to using O-rings the elastic material may be provided on the covering side in various other shapes and distribution patterns.

The protection devices described above can be made of various materials. The covering sleeve and/or the actuating element can for instance be manufactured from a metal or from a plastic, for example by means of injection moulding. It is possible to manufacture both the covering sleeve and the actuating element from the same material. However, it is also possible to manufacture these two parts from mutually different materials, for example the covering sleeve from a plastic and the actuating element from a metal or a metal alloy, or vice versa.

In the foregoing specification, the invention has been described with reference to specific examples of embodiments of the invention. It will, however, be evident that various modifications and changes may be made therein without departing from the broader scope of the invention as set forth in the appended claims. For example, it is possible to apply various types of inclination, including tapered ones and curved ones, of the side 32 of the sleeve wall 31 of the actuating element 3 and of the side 132 of the actuating body 131 of the actuating element 103. Also, these inclinations may have, as compared to the examples shown in the figures, opposite angles relative to the central axes 5 and 105, in which cases the locking and unlocking directions 40, 41, 140, 141 are reversed relative to the locking directions 40, 140 and unlocking directions 41, 141 shown in the examples. Furthermore, it is possible to apply such inclinations with the same purpose in the sleeve walls of the covering sleeves, instead of or in addition to such inclinations in the actuating elements. However, other modifications, variations and alternatives are also possible. The specifications and drawings are, accordingly, to be regarded in an illustrative rather than in a restrictive sense.

The invention claimed is:

1. A wellbore pipe protection device for protecting, in a condition mounted to a wellbore pipe end, the screw thread of the pipe end, wherein the protection device in the mounted condition is manually operable to interchange its condition between:
   a locked condition in which the protection device is fixed to the pipe in a manner so as to prevent the protection device from becoming detached from the pipe due to certain accidental external impacts, and
   an unlocked condition in which the protection device is fixed to the pipe less firmly than in the locked condition and in which the protection device is manually removable from the pipe;
and wherein the protection device comprises:
   a covering sleeve comprising a peripheral sleeve wall, wherein one side of the sleeve wall is a covering side for covering, in the mounted condition, the screw thread of the pipe end, and wherein the covering sleeve is provided on the covering side of the sleeve wall with elastic material, and wherein at least part of the sleeve wall is flexible while the sleeve wall is interrupted by slits whose length directions extend at least in axial direction of the sleeve, such that the sleeve wall is deformable in such way that at least the diameter of the sleeve wall is, in at least a subrange in axial direction of the sleeve, adjustable, which adjustability enables the said interchangeability between the locked condition and the unlocked condition in that the elastic material in the locked condition is being pressed by the sleeve wall into the screw thread, while in the unlocked condition it is not, or less firmly than in the locked condition, being pressed into the screw thread; and
   an actuating element being slidable, relative to the covering sleeve, at least with a component in the axial direction of the covering sleeve for realizing changes in the deformation state of the sleeve wall in order to realise the said interchangeability between the locked condition and the unlocked condition;
   characterized in that the actuating element comprises a handgrip which, relative to the covering sleeve, is manually slidable at least with a component in said axial direction for realizing said slidability of the actuating element, and which, in the locked condition, relative to the covering sleeve, is manually rotatable about said axial direction into a rotation position in which said slidability of the actuating element is blocked at least in a direction towards the unlocked condition.

2. The protection device according to claim 1, wherein the covering sleeve and the actuating element are manually undetachable relative to one another.

3. The protection device according to claim 1 or 2, wherein elastic sealing material is filling up the slits in the sleeve wall.

4. The protection device according to claim 1 or 2, wherein at least part of the elastic material is elastic material of at least one O-ring extending coaxially relative to the sleeve wall.

5. The protection device according to claim 4, wherein the sleeve wall comprises at least one annular groove in which the at least one O-ring is received.

6. The protection device according to claim 1 or 2, wherein the protection device is arranged for protecting outside screw thread of a wellbore pipe end and the covering side of the sleeve wall is the side of the sleeve wall facing towards the central axis of the sleeve wall for covering, in the mounted condition, the outside screw thread when the sleeve wall is coaxially slid over the pipe end.

7. The protection device according to claim 1 or 2, wherein the protection device is arranged for protecting internal screw thread of a wellbore pipe end and the covering side of the sleeve wall is the side of the sleeve wall facing away from the central axis of the sleeve wall for covering, in the mounted condition, the internal screw thread when the sleeve wall is coaxially inserted into the pipe end.

8. The protection device according to claim 7, wherein an elastic sealing disc is retained by the actuating element at a side of the covering sleeve facing away from the handgrip, which sealing disc extends substantially coaxially with the covering sleeve and substantially transverse to said axial direction.

* * * * *